March 28, 1939.  W. BLACKMORE  2,151,731
CHAIN
Filed Feb. 7, 1936  2 Sheets-Sheet 1

INVENTOR:
William Blackmore
BY
Clarence B Kerr
his ATTORNEY.

March 28, 1939.  W. BLACKMORE  2,151,731
CHAIN
Filed Feb. 7, 1936  2 Sheets-Sheet 2
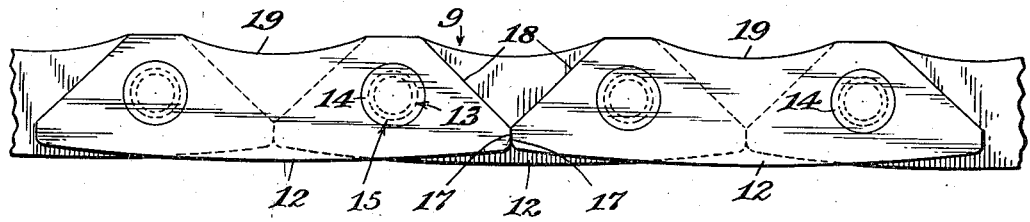
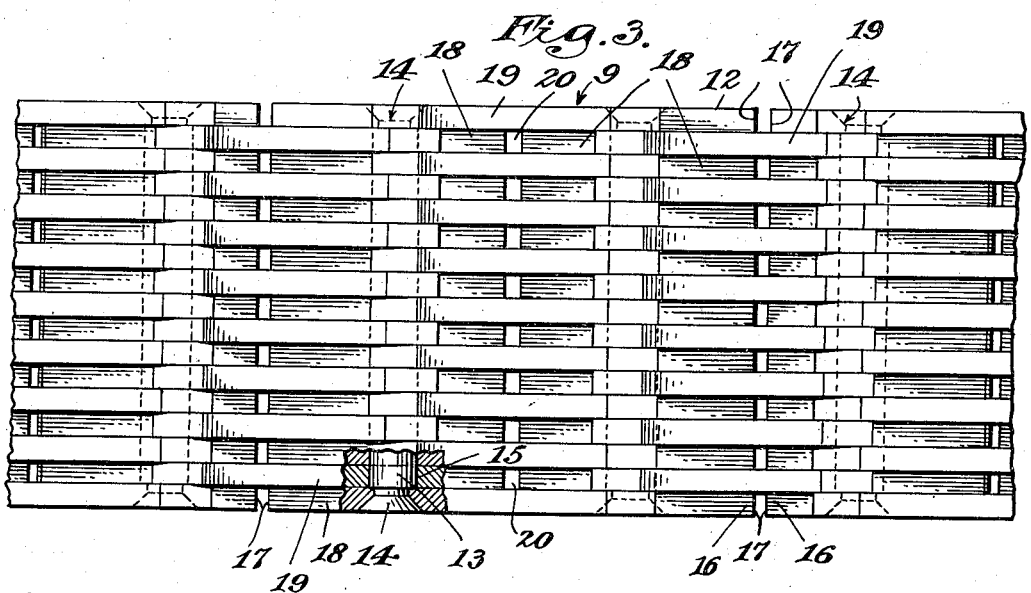
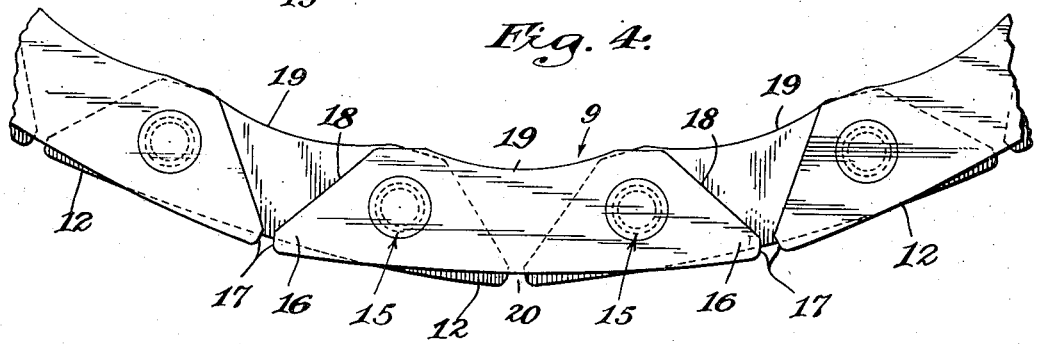
INVENTOR:
William Blackmore
BY
his ATTORNEY.

Patented Mar. 28, 1939

2,151,731

UNITED STATES PATENT OFFICE 2,151,731

CHAIN

William Blackmore, Cleveland Heights, Ohio, assignor to National Malleable and Steel Castings Company, Cleveland, Ohio, a corporation of Ohio Application February 7, 1936, Serial No. 62,763

4 Claims. (Cl. 308—129)

This invention relates to a link chain which is bendable in only one direction and is more particularly concerned with such a chain for lifting lubricant out of a well and conveying it to a bearing or group of bearing elements. The invention will be described as applied to railway car journals, it being understood that the invention may be employed just as effectively in other ways.

Oil conveying belts or the like have been used on railway car journals for supplying oil to the journal and bearing elements as described in my co-pending applications Serial Number 620,682, filed July 2, 1932 now patent No. 2,069,488 and Serial Number 30,079, filed July 6, 1935. In such a device the belt or chain is simply slipped over the end of the journal and the bearing elements are provided with a groove through which the chain may travel. A loop of the chain or belt hangs down from the journal into an oil well of any suitable construction. As the journal rotates, this oil conveyor is likewise rotated and carries oil from the well to the journal and bearing elements.

In the use of chains and belts for this purpose it has been found that such oil conveyors have the tendency to wrap themselves about the journal when the oil is cold or of high viscosity. This lifts the chain out of the oil bath and stops lubrication with its attendant difficulties. A further difficulty encountered in this system of lubrication is caused by the collection of dirt on a chain which produces slippage between the chain and journal. Ordinary chains previously used for this purpose have the further disadvantage in that they are relatively porous and throw off oil which they have picked up before reaching the journal. This disadvantage is most prevalent at the higher speeds such as now encountered. It is an object of this invention to overcome these disadvantages of the prior art constructions.

I have discovered that a plate link belt or chain may be rendered satisfactory for use as an oiling chain, if the ends of the links are extended so as to abut each other when the belt is straightened out while still allowing the chain to be bent in one direction. Such a construction produces a chain in which back-bending is prevented and which thus effectively overcomes tendencies of the chain to wrap itself about the journal. As oil is carried upwardly by such a chain there are substantially no openings through which the oil may be thrown out by centrifugal force, and practically all of the oil is thus carried to the journal and bearing members where it is needed.

A further object of my invention, therefore, is to provide a chain which will not bend backwardly and which is relatively non-porous.

Another object of my invention is to so shape the inner surfaces of the links that accumulation of dirt is retarded while providing sufficient tractive surfaces to enable the journal to positively rotate the chain.

Further objects and advantages of this invention will be more apparent from a detailed description of one embodiment thereof illustrated in the drawings, in which:

Figure 2 is a side elevation on an enlarged scale of a section of the chain shown in Figure 1.

Figure 3 is a top plan view of the section of chain shown in Figure 4 and broken away to illustrate the manner of joining the links.

Figure 4 is a side elevation of a section of the chain shown in curved position.

Figure 1:
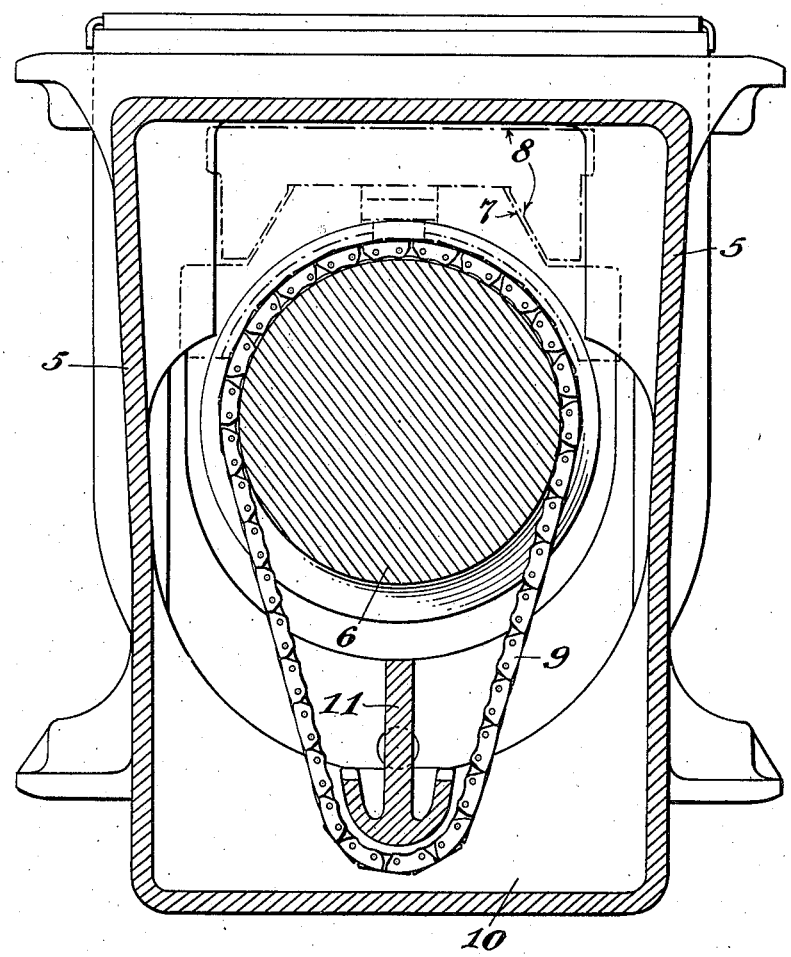
Figure 1 is a vertical cross section of a railway journal and journal box illustrating an oiling chain in side elevation and illustrating the bearing elements diagrammatically.

Numeral 5 indicates a journal box which is mounted upon a journal 6 by means of the brass 7 and wedge 8. The particular type of journal box construction illustrated in Fig. 1 is further illustrated and described in my above-mentioned co-pending application Serial Number 30,079, although any other suitable constructions may be used. Chain 9 is looped over the journal and has a depending portion which extends down into the oil well 10 of the journal box. While it is not necessary, I prefer to employ a guard member 11; this is used merely in the nature of a precautionary measure to insure retention of the lower portion of the chain in the oil well and to prevent any tendency of the chain to knock against the side walls of the journal box.

Referring more particularly to Figs. 2–4, it may be seen that chain 9 is made up of a plurality of plate-like links 12 alternately disposed and connected together by pintles 13 which may be shouldered at each end to provide portions of smaller diameter that may be riveted as at 14, 14 into countersunk holes in the outermost links to retain the chain in assembled position. The invention, however, is not limited to the use of any particular pintle construction. Except for these side links which are countersunk, each of the chain links is preferably identical and provided with a pair of openings 15, 15 for receiving pintles.

The end portions 16, 16 of each of the links extend from the centers of the openings 15 in said link a distance equal to about one half of the distance between the centers of the two openings. Thus, the relatively small end surfaces 17 of adjacent links abut each other as illustrated in Fig. 2 when the chain is straightened. These surfaces 17 are shown disposed wholly on one side of a line connecting the centers of the openings 15 and act as stops to prevent back bending of the chain. To allow for bending of the chain in the other direction, however, so that it may easily lie smoothly against a curved member, such as the journal, the remaining portions of the ends 16 are provided with tapered surfaces 18, 18 which converge toward the inner side of the belt. Under unusual movement one of the surfaces 17 may slip by the other, thus providing a kink in the chain. By making these surfaces 17 relatively small, however, the links are allowed to readily slip back into their correct position as the chain is curved in the opposite direction. The surfaces 18 being tapered also assist in the return of the links to their normal positions.

In order to prevent the collection of dirt and other foreign material on the inner face of the chain, the inner surface of each link is preferably constructed with a curved section 19 which has a relatively long radius of curvature; this radius is preferably shorter than the radius of the journal.

In the operation of the device, the chain travels through the oil in a curved position and openings 20 are thus formed between the adjacent end surfaces 17. This allows oil to pass through the chain while it is immersed in the lubricant. As the chain leaves the oil well, however, it becomes straightened, closing the openings 20, and the oil enmeshed therein is efficiently carried up to the journal where it is deposited or thrown outwardly due to the chain being curved and more open again.

It is to be understood that it is within the spirit of my invention to employ a chain such as described above for other uses analogous to the lubrication of railway car journals. In addition the chain may be used for other purposes than to convey lubricant where a no-back-bend chain is desired.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. A chain for lubricating railway journals consisting of a plurality of plate links connected by pintles, each of said links having inner surfaces curved about a radius shorter than the radius of the journal, end surfaces converging toward the inner side of the chain, and other end surfaces disposed outwardly of said pintles and arranged to abut similar portions of adjacent links to prevent back bending of the chain.

2. A chain for lubricating railway car journals comprising a plurality of rows of plate links in contact with each other and connected by pintles, the ends of each of said links being constructed and arranged to abut the ends of adjacent links substantially throughout their width when the chain is straight to prevent back bending of the chain, and to be spaced from each other providing openings for discharge of lubricant when the chain is bent around a journal.

3. In combination with a railway journal, a chain surrounding said journal and having a free loop depending therefrom for conveying lubricant to said journal, said chain being composed substantially entirely of rows of plate links in contact with each other and connected by pintles, the ends of each of said links being constructed to abut the ends of adjacent links substantially throughout their width when the chain is straight to prevent back bending of the chain, and to be spaced from each other providing openings for discharge of lubricant when the chain is bent around the journal.

4. A combination as defined in claim 3 in which the inner surfaces of the plate links have projections forming spaced points of contact between the links and the journal.

WILLIAM BLACKMORE.